United States Patent
McClurkin, Jr.

(10) Patent No.: US 11,815,140 B2
(45) Date of Patent: *Nov. 14, 2023

(54) INCREASING MECHANICAL ADVANTAGE THROUGH THE USE OF A ROTATING LIQUID

(71) Applicant: John McClurkin, Jr., Frederick, MD (US)

(72) Inventor: John McClurkin, Jr., Frederick, MD (US)

(73) Assignee: Werlpower, LLC, Las Vegas, NV (US)

( * ) Notice: Subject to any disclaimer, the term of this patent is extended or adjusted under 35 U.S.C. 154(b) by 53 days.

This patent is subject to a terminal disclaimer.

(21) Appl. No.: 17/665,622

(22) Filed: Feb. 7, 2022

(65) Prior Publication Data

US 2022/0163072 A1  May 26, 2022

Related U.S. Application Data

(63) Continuation-in-part of application No. 16/835,886, filed on Mar. 31, 2020, now Pat. No. 11,242,838.

(60) Provisional application No. 62/919,821, filed on Apr. 1, 2019.

(51) Int. Cl.
*F16D 33/20* (2006.01)

(52) U.S. Cl.
CPC .................. *F16D 33/20* (2013.01)

(58) Field of Classification Search
CPC ....... F16D 33/20; F05B 2260/421; F03B 1/00
See application file for complete search history.

(56) References Cited

U.S. PATENT DOCUMENTS

| | | | |
|---|---|---|---|
| 2,235,672 A | 3/1941 | Dodge | |
| 2,256,018 A | 9/1941 | Custer | |
| 2,310,178 A | 2/1943 | Jauch et al. | |
| 2,368,437 A | 1/1945 | Alexandrescu | |
| 2,603,103 A | 7/1952 | Sohon et al. | |
| 2,963,867 A | 12/1960 | Amiard | |
| 2,964,963 A | 12/1960 | Fischer | |
| RE24,947 E | 3/1961 | Kelley | |
| 2,999,400 A | 9/1961 | Kelley | |
| 3,002,356 A | 10/1961 | Black et al. | |
| 3,005,359 A | 10/1961 | Ahlen | |
| 3,248,967 A | 5/1966 | Lewis | |
| 3,743,539 A * | 7/1973 | Kroyer et al. | B01D 9/0031 241/46.11 |
| 3,930,745 A | 1/1976 | Gassie | |
| 4,246,753 A | 1/1981 | Redmond | |
| 4,335,627 A | 6/1982 | Maxwell | |
| 4,551,631 A | 11/1985 | Trigilio | |
| 4,645,603 A * | 2/1987 | Frankl | C02F 3/1294 210/695 |
| 4,735,382 A | 4/1988 | Pinson | |
| 5,083,899 A | 1/1992 | Koch | |
| 5,086,664 A | 2/1992 | Wagner | |

(Continued)

*Primary Examiner* — Pedro J Cuevas
(74) *Attorney, Agent, or Firm* — The Law Office of Kevin McDermott, PLLC

(57) ABSTRACT

The disclosed invention is a description of the means to create increased mechanical advantage by taking advantage of the rotation of confined liquid matter. The process described uses liquid both as a mass to store rotational energy, and at the same time the rotating liquid is used as a motive force to drive a rotating shaft.

17 Claims, 4 Drawing Sheets

(56) References Cited

U.S. PATENT DOCUMENTS

| | | | |
|---|---|---|---|
| 5,145,255 A * | 9/1992 | Shimada | B01J 19/18 |
| | | | 422/135 |
| 5,263,814 A | 11/1993 | Jang | |
| 5,490,436 A | 2/1996 | Coyne et al. | |
| 6,765,308 B1 | 7/2004 | Kazanjian et al. | |
| 6,883,399 B2 | 4/2005 | Burstall | |
| 7,242,108 B1 | 7/2007 | Dablo | |
| 7,288,850 B2 | 10/2007 | Hicks et al. | |
| 8,063,502 B1 | 11/2011 | Voyles | |
| 8,310,078 B2 | 11/2012 | Shreider et al. | |
| 8,314,508 B2 | 11/2012 | Kawas et al. | |
| 8,362,637 B2 | 1/2013 | Kawas et al. | |
| 9,048,705 B2 | 6/2015 | Ko | |
| 9,618,002 B1 | 4/2017 | Cabra et al. | |
| 10,815,962 B1 | 10/2020 | Lu | |
| 10,899,217 B2 | 1/2021 | Dugas | |
| 11,091,732 B2 * | 8/2021 | Scarpone | C12M 45/02 |
| 2009/0033162 A1 | 2/2009 | Dugas | |
| 2010/0189553 A1 | 7/2010 | Yoo et al. | |
| 2011/0140450 A1 | 6/2011 | Kawas et al. | |
| 2011/0259143 A1 | 10/2011 | Murphy | |
| 2017/0138343 A1 * | 5/2017 | Tseng | F03D 3/0472 |
| 2019/0322979 A1 * | 10/2019 | Scarpone | C12N 5/0653 |
| 2020/0347816 A1 | 11/2020 | McClurkin, Jr. | |
| 2021/0380927 A1 * | 12/2021 | Scarpone | C12N 5/0667 |
| 2023/0103472 A1 * | 4/2023 | Gerboth | B09B 3/38 |
| | | | 366/279 |

* cited by examiner

INCREASING MECHANICAL ADVANTAGE THROUGH THE USE OF A ROTATING LIQUID

CROSS-REFERENCE TO RELATED APPLICATIONS

This is a continuation-in-part application of U.S. patent application Ser. No. 16/835,886, filed Mar. 31, 2020, which claims the benefit of the priority of U.S. Provisional Patent Application No. 62/919,821, filed Apr. 1, 2019, the disclosures of which are incorporated herein by reference.

BACKGROUND OF THE INVENTION

The present disclosure relates generally to the field of kinetic energy transfer originating in the form of rotational energy storage which is transferred by mechanical means to perform useful work. Flywheels and waterwheels are the most similar examples as the current invention incorporates features of both, but in a novel fashion allowing useful work to be done.

Flywheels and water wheels have been used for storing and transferring mechanical energy for hundreds of years. The water wheel was the first source of large-scale power for the industrial revolution while high strength high speed flywheels are currently being proposed as the "mechanical battery" to store energy from renewable energy sources.

In the case of water wheels, a source of flowing water is used to impart movement to a rotating wheel mass that accumulates the energy from the water flow as rotational energy. For water wheels, all of the mechanical force to rotate the wheel comes from the flowing water and all of the rotational energy is stored in the mass of the wheel. Water wheels are generally lower revolution per minute (RPM) devices with a large mass in the wheel. Water wheels are limited because it is difficult to have a large enough mass to increase energy storage because increasing the mass only increases the energy storage in a linear progression. Another difficulty with a large solid mass is the energy required to start the wheel in motion may not be available if the mass of the wheel is too great.

Modern flywheels contain substantial mass but generally obtain their maximum energy storage by being spun at extremely high RPMs, in some cases up to 50,000 RPM. High RPMs is a preferred method for flywheels because the energy stored increases with the square of the velocity increase. But such high rotational velocities require the use of expensive composite materials, magnetic bearings, vacuum chambers and extensive safety measures in case of catastrophic failure.

Methods for increasing mass for storing rotational energy are known. For example, U.S. Patent Application Publication No. 2011/0259143 A1 describes a method in which water is used for increasing the mass of the flywheel so larger amounts of rotational energy can be stored, but the water only works as mass and rotational energy is increased by external mechanical means only. Another example is U.S. Patent Application Publication No. 2009/0033162 A1 which uses a rotating flywheel to add energy to the liquid surrounding it for energy storage.

Internationally, several water powered generators use water to turn the generator and increase the effect of the water by having it circle around a vortex shaped container and then exit out the bottom. In these applications, the water flows through the container only once and no effort is made to use the water to increase the available mass for storing more rotational energy.

BRIEF DESCRIPTION OF THE INVENTION

The present invention uses liquid that is contained and rotated. Rather than have the liquid simply flow through the container, effort is made to retain as much of the liquid as feasible and increase its rotational velocity. For this reason, the outlet for the liquid is specifically placed above the level of the input.

In the current process described, energy is continuously input in the form of work done on the contained liquid to cause continuous rotation at the same rotational velocity, while simultaneously mechanical energy is continuously extracted in the form of a rotating shaft.

Another advantage with the present invention is if it is a large liquid mass, it is not necessary to set the entire mass in rotation "all at once" as is the case with a single solid mass. Parts of the liquid will begin flowing and as the work done on the system continues, eventually all of the contained liquid will be rotating uniformly.

In one aspect of the invention, a fluid flywheel device is provided that includes a container having an inner wall, an inlet for allowing a non-compressible liquid to enter the container, an outlet to allow the liquid to exit the container, a shaft concentrically positioned in the container, a paddle fixed to the shaft, and a bottom. The outlet is positioned above the level of the inlet causing liquid removed from the container to be from above the inlet.

In one embodiment of the invention, the inlet is tangentially aligned with the inner wall of the container and the outlet is tangentially aligned with the inner wall of the container on an opposite side of the container.

In another embodiment of the invention, the shaft is a non-rotating shaft and the fluid flywheel includes means for reducing vortex formation that includes at least one arm extending radially from the shaft and fixing the paddle to the at least one radial arm. Alternatively, the means may include a channel extending about the perimeter of the bottom.

In another aspect of the invention, a fluid flywheel device is provided that includes a container having an inner wall, an inlet for allowing liquid to enter, an outlet to allow liquid to exit, a non-rotating shaft, a rotatable post mounted on a top of the shaft, at least one arm extending radially from the post, and a paddle fixed to the at least one radial arm.

In one embodiment of the invention, the inlet is tangentially aligned with the inner wall of the container and the outlet is tangentially aligned with the inner wall of the container on an opposite side of the container.

BRIEF DESCRIPTION OF THE DRAWINGS

The present invention will be explained below by means of non-limiting examples with reference to the accompanying drawings.

DETAILED DESCRIPTION OF THE INVENTION

The following detailed description is made with reference to the accompanying drawings and is provided to assist in a comprehensive understanding of various exemplary embodiments of the present invention. The following description includes various details to assist in that understanding, but these are to be regarded as merely examples. Accordingly, those of ordinary skill in the art will recognize that various changes and modifications of the examples described herein can be made without departing from the spirit and scope of the present invention.

The terms and words used in the following description and claims are merely used to enable a clear and consistent understanding of the present invention. Accordingly, it should be apparent to those skilled in the art that the following description is provided for illustration purposes only, and not for the purpose of limiting the present invention as defined by the appended claims and their equivalents.

Waterwheels are designed to use the direct flow of water to rotate a mass, and flywheels are designed to accumulate energy through work done on them by mechanical means and may use a liquid for increasing their relative mass. The current invention uses liquid for both increasing mass for increased rotational energy and as a motive force to drive a rotating shaft. The current invention uses rotating liquid to apply work to a paddle to turn the rotating shaft.

The current invention is a continuous direct motive force used to spin a rotating shaft. While the present invention resembles a flywheel storage device, and can store energy and be used like a flywheel, a storage device implies an input of energy and then a passage of time before the energy is converted back into useable work. In the current process described, energy is continuously input in the form of work done on the contained liquid to cause continuous rotation at the same rotational velocity, while simultaneously mechanical energy is continuously extracted in the form of a rotating shaft.

Figure 1:
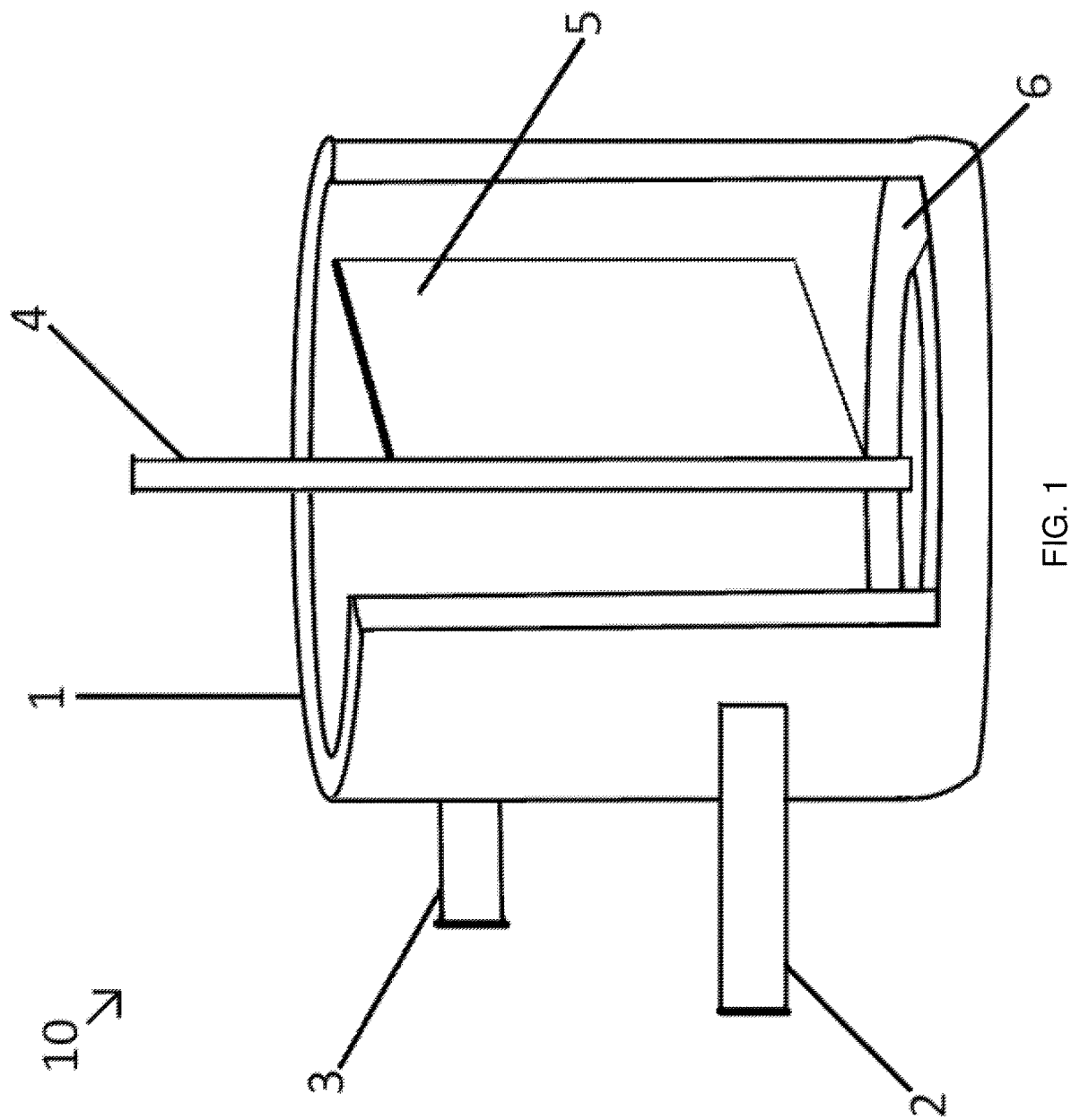
FIG. 1 shows a cutaway view of the parts of one possible embodiment of the invention including a circular container with an inlet and outlet for liquid, a rotating shaft with an affixed paddle and a trough in the bottom of the container.
Figure 2:
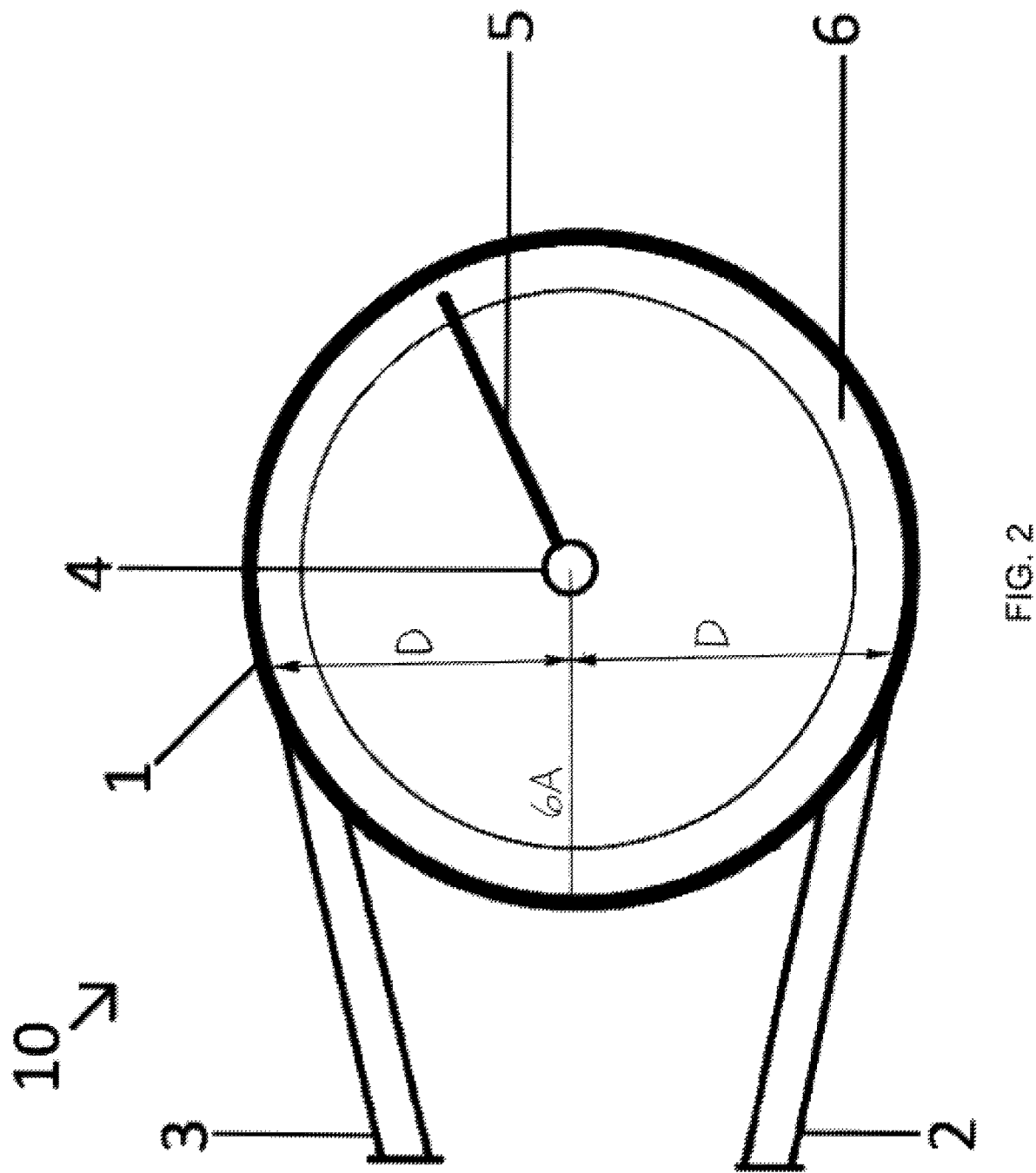
FIG. 2 shows a top view of the parts of one possible embodiment of the invention including a circular container with an inlet and outlet for liquid, a rotating shaft with an affixed paddle, and a trough in the bottom of the container.

FIG. 1 is a diagram of a cutaway view of the parts of an example fluid flywheel device 10 for increasing mechanical advantage through use of a rotating liquid. The fluid flywheel device 10 includes a circular container 1 with an inlet 2 and an outlet 3 for liquid, a rotating shaft 4 with an affixed paddle 5 and a trough 6 in the bottom of the container 1. FIG. 2 is a top view of the example fluid flywheel device 10 as shown in FIG. 1 illustrating the tangential alignment of the inlet 2 and the outlet 3 with the interior wall of the container 1.

The container 1 has a circular interior sufficient in strength to contain the rotating liquid. The container 1 can be any diameter and any depth and can be made of any material that would impart sufficient strength to contain rotating liquid. For example, the container 1 may be a water bucket or may be a large water tank comparable to that found in water and wastewater treatment plants. A water bucket may be made from plastic while a large water tank may be made from concrete.

The preferred embodiment to impart rotation to the contained liquid is to inject liquid into the container 1 through the inlet 2 aligned tangentially with the interior wall of the container 1 and allow it to exit through the outlet 3 (also aligned tangentially) on the opposite side of the container 1. The inlet 2 and the outlet 3 may each include a hole or opening in the container wall with a pipe positioned therein. Alternatively, the inlet 2 and outlet 3 may include the opening only. The openings may be any shape, for example, circular or elliptical.

The pipes should have a circular cross section. Alternatively, the pipes may have any cross section including, but not limited to, square and elliptical. The pipe of inlet 2 may have the same or different cross section as the pipe of outlet 3. The inlet 2 and outlet 3 pipes may be made of any material and may have the same or different diameter.

The diameters of the inlet 2 and outlet 3 pipes may be designed to control velocity of liquid flowing into the container 1. However, the outlet pipe 3 should not have a diameter smaller than the diameter of the inlet pipe 2. Similarly, when the inlet 2 and the outlet 3 are openings only, the outlet 3 should not have a diameter or size smaller than the diameter or size of the inlet 2.

As shown in FIG. 2, the pipe of inlet 2 and the pipe of outlet 3 are tangentially aligned with the interior wall of the container 1 at locations that should be the same distance D from a radial 6A of the container 1. Thus, it should be understood that the locations at which the pipe of inlet 2 and the pipe of outlet 3 are tangential to the container 1 are symmetrical about the radial 6A of the container 1. It is contemplated by the present disclosure that the locations at which the pipe of inlet 2 and the pipe of outlet 3 are tangential to the container 1 may be symmetrical about any radial 6A of the container 1.

The depth of the top of the inlet 2 beneath the surface of the liquid rotating in the container 1 may be any depth that facilitates increasing mechanical advantage using rotating liquid as described herein, for example, three feet. The top of the outlet 3 should also be beneath the surface of the liquid rotating in the container 1. However, the top of the outlet 3 should be closer to the surface of the rotating liquid than the top of the inlet 2. The depth of the top of the outlet 3 beneath the surface of the liquid may be, for example, about one foot. It is contemplated by the present disclosure that the depth of the inlet 2 and outlet 3 beneath the surface of the liquid may vary with the size of the container 1. It should be understood that the invert elevation of the outlet 3 should be above the top of the inlet 2 to facilitate retaining liquid in the container 1. The radius of the container 1 is measured from a center of the container 1 to the interior wall.

Liquid is injected by means of a mechanical pump (not shown), gravity flow, or other means that imparts flow to the liquid prior to its entering the container 1, the energy of the flow is then transferred to the liquid already in the container 1. The liquid in the container 1 may also be induced to rotation by the application of a force to the rotating shaft 4. The liquid flowing out of the container 1 through the outlet 3 may also be redirected to use its kinetic energy. The liquid injected and used throughout the container 1 should be non-compressible. While any number of fluids could work with the process described, the preferred embodiment is water, because it is a non-compressible fluid, abundant, easy to handle and harmless to the environment.

Injected liquid will cause rotation because of the circular nature of the container 1, and if the rotational velocity of the contained liquid is less than the velocity of the incoming liquid, the incoming liquid will perform work on the contained liquid increasing its rotational velocity. This additional work will be translated as increased rotational velocity leading to increased kinetic energy which will be available to perform work. Once the velocity of the rotating liquid and the incoming liquid are equal, the contained liquid will continue to rotate at the same velocity as long as liquid is continually injected into the container 1 at the same velocity and volume that caused the initial rotation to begin and no additional load is applied.

The velocity and volume of the liquid being injected into the container 1 causes rotation. The liquid may enter the container either as a constant stream, or be pulsed. The volume is to be sufficiently large to affect the total volume in the container 1 in a timely manner, and the velocity must be such that it equals or exceeds the rotational speed necessary in conjunction with the mass of the contained liquid to produce the necessary torque (as determined by Torque=Iω) that is needed to produce the desired amount of work.

Rather than have the liquid simply flow through the container 1, effort is made to retain as much of the liquid as feasible and increase its rotational velocity. For this reason, the outlet 3 for the liquid is specifically placed above the level of the inlet 2. Since the outlet 3 is above the inlet 2, the majority of the liquid removed from the container 1 is liquid above the inlet 2 and only the liquid that directly aligns with the outlet 3. This reduces the energy needed to remove liquid from the container 1 and allows liquid that is already rotating at maximum velocity to remain in the container 1.

A paddle 5 is attached to the rotating shaft. Preferably, the paddle 5 is a single bladed rigid paddle with counter weight if needed and has a rectangular shape. Alternatively, the paddle 5 may have any shape that facilitates increasing mechanical advantage using rotating liquid in the container 1. For example, the paddle may have a square or semicircular shape.

The rigid paddle 5 extends from just below the surface of the liquid to just above the bottom of the container 1 and provides a rigid surface against which all of the moving liquid molecules can impact, then, transfers the energy of that impact to all of the liquid molecules in front of the paddle through the movement of the paddle 5. Having a single rigid surface rotating with the liquid works to limit internal turbulence and helps to increase the cohesion of the rotating liquid. It also provides a simple means to allow the rotating liquid in the container 1 to transfer energy and cause rotation in the shaft 4.

Two important design considerations of the present invention are to limit turbulence which degrades rotational energy, and to prevent the formation of a vortex in the rotating liquid. Turbulence can be reduced by the container 1 having smooth, water repellant interior walls. A vortex occurs when the rotational energy moves liquid from the center of the container 1 forcing it against the interior wall and causing the outer edges of the liquid to rise while a depression forms at the center. This can cause a loss of force against the paddle 5. A channel (trough) 6 at the bottom of the container 1, circling the bottom of the container 1 against the interior wall, equal in depth to the rise of the liquid at the surface caused by the rotation of the liquid, its depth and width based on the designed rotational speed of the liquid, is included in the preferred embodiment to reduce vortex formation. Alternatively, the trough 6 may be any depth and width that facilitates inhibiting vortex formation.

Figure 3:
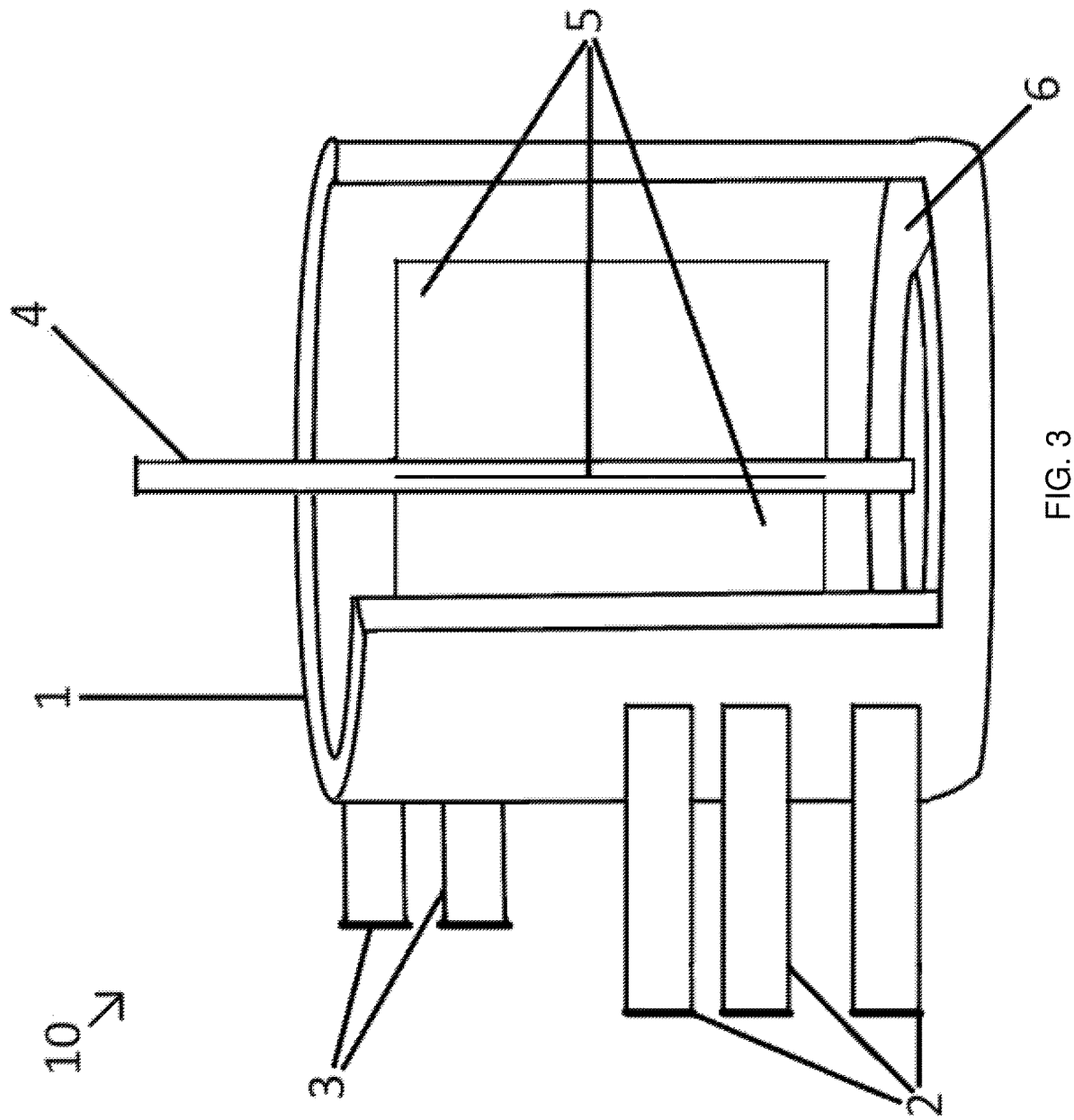
FIG. 3 shows a cutaway view of the parts of one possible embodiment of the invention including a circular container with multiple inlets and multiple outlets for liquid, a rotating shaft with multiple affixed paddles and a trough in the bottom of the container; and, FIG. 4 is a perspective view of the parts of an alternative example fluid flywheel device similar to the fluid flywheel device shown in FIG. 1.

FIG. 3 is a diagram illustrating a cutaway view of the parts of an alternative example fluid flywheel device 10 similar to the fluid flywheel device 10 shown in FIG. 1. However, the fluid flywheel device 10 includes multiple inlets 2 and multiple outlets 3 for liquid, and the rotating shaft 4 has multiple paddles 5 affixed thereto. Although three inlets 2 and two outlets 3 are shown in FIG. 3, it is contemplated by the present disclosure that any number of inlets 2 and any number of outlets 3 may be included that facilitate injecting liquid into the container 1 and draining liquid from the container 1 such that energy of the flow from the inlets 2 is transferred to liquid already in the container 1.

Figure 4:
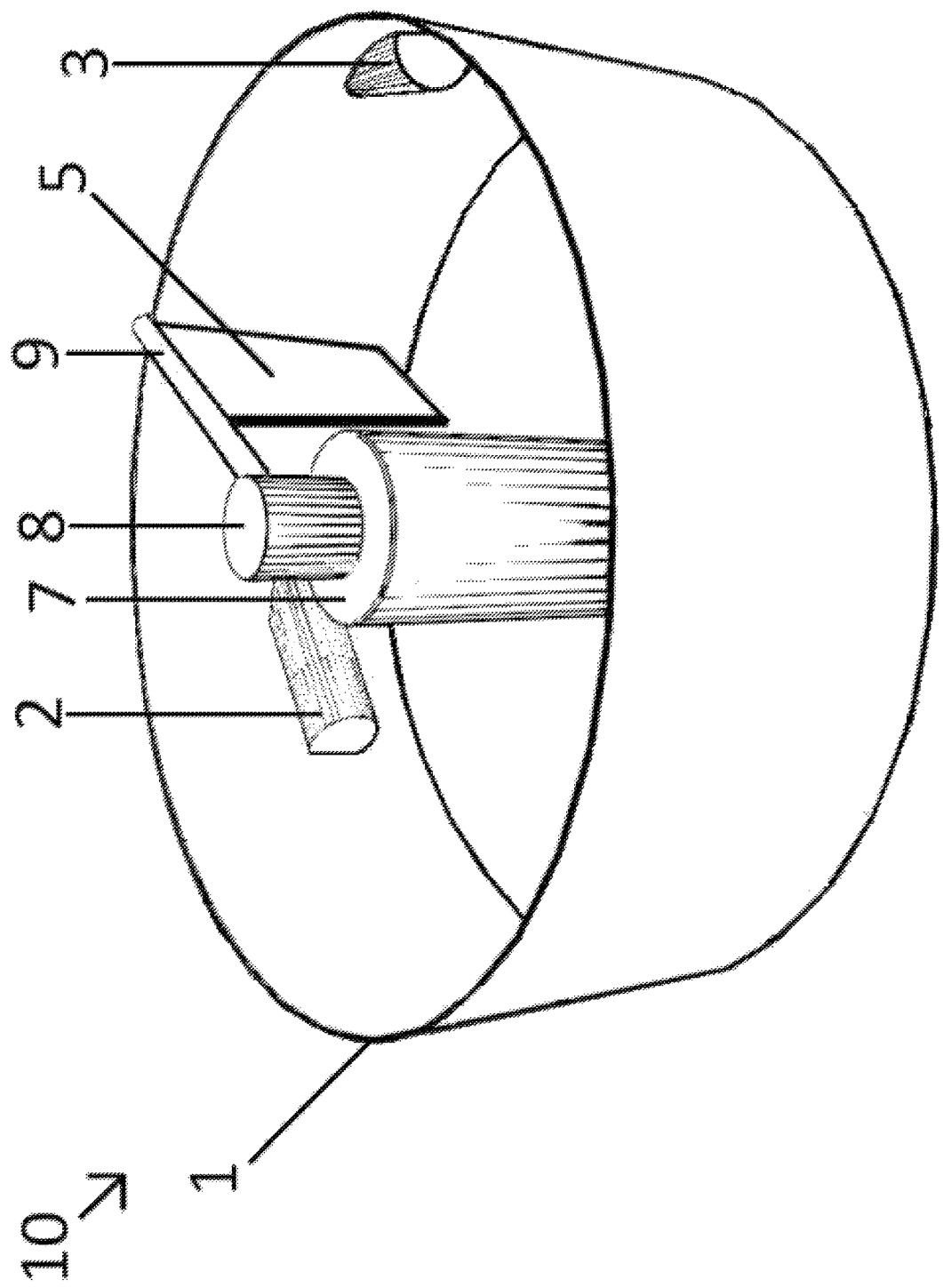

The information shown in FIG. 4 is the same information shown in FIG. 1 as described in more detail below. As such, features illustrated in FIG. 4 that are identical to features illustrated in FIG. 1 are identified using the same reference numerals used in FIG. 1.

FIG. 4 is a perspective view of the parts of yet another alternative example fluid flywheel device 10 similar to the fluid flywheel device 10 shown in FIG. 1. However, the diameter of the container 1 is much larger, a non-rotating shaft 7 having a diameter larger than the diameter of the rotating shaft 4 is concentrically positioned in the container 1, the paddle 5 is connected to an arm 9 extending radially from the shaft 7, and the container 1 may not include the trough 6. More specifically, the ratio of the diameter to the depth of the container 1 is larger than the example container 1 shown in FIG. 1. Because the shaft 7 has a larger diameter than the rotating shaft 4, the shaft 7 has a larger perimeter and thus a larger exterior surface which forms a second interior wall of the container 1.

The radius of the shaft 7 may be one-third of the radius of the container 1 and the distance between the exterior surface of the shaft 7 and the interior wall of the container 1 may be two-thirds of the radius of the container 1. Alternatively, the radius of the shaft 7 and the distance between the exterior surface of the shaft 7 and the interior wall of the container 1 may be any distances that facilitate increasing mechanical advantage through the use of liquid rotating in the container 1.

The shaft 7 is concentrically positioned within the container, is fixed to the bottom of the container 1, and does not rotate. A post 8 is concentrically mounted on a top of the shaft 7. The post 8 includes bearings which allow the post 8 to rotate. The post 8 has a circular cross section. An arm 9 is connected to and extends radially away from the post 8. The arm 9 may extend any distance between the exterior surface of the shaft 7 and the interior wall of the container 1. The paddle 5 is connected to the arm 9 and extends towards the bottom of the container 1. The paddle 5 may extend any length along the radial arm 9. Although a single arm 9 and corresponding paddle 5 are included in this alternative example device 10, it is contemplated by the present disclosure that any number of radial arms 9 and corresponding paddles 5 may be connected to the post 8 that facilitate increasing mechanical advantage through use of a liquid rotating in the container 1. For example, two radial arms 9 may be connected to the post 8 that extend in opposite directions from the post 8. The arm 9 may be made from any material capable of supporting the paddle 5 and withstanding the forces transferred from the paddle 5 to the post 8. For example, the arm 9 may be made from materials such as, but not limited to, steel.

It is contemplated by the present disclosure that the post 8 and radial arm 9 are positioned above the surface of liquid in the container 1. Although the post 8 is described herein as having a circular cross section, it is contemplated by the present disclosure that the post 8 may have any cross section that facilitates connecting any number of radial arms 9 deemed necessary to increase mechanical advantage using the liquid rotating in the container 1. For example, the post 8 may have a square, rectangular, or octagonal cross section. Moreover, the paddle 5 may extend any distance away from the radial arm 9 towards the bottom of the container that facilitates enhancing mechanical advantage using the liquid in the container 1. For example, the paddle 5 may extend ninety percent of the distance between the radial arm 9 and the bottom of the container 1.

The exterior surface of the shaft 7, the bottom of the container 1, and the interior wall of the container 1 form a channel through which liquid flows. The channel may have any shape, for example, a U-shape, a C-shape, or may have a semicircular cross-section. As liquid flows through the channel, the liquid causes the paddle 5 to move and thus cause the post 8 to rotate. It should be understood that by increasing the diameter of the container 1, using the shaft 7 having a larger diameter than the shaft 4, and connecting the paddle 5 to an arm 9 extending radially from the post 8 such that the paddle 5 rotates in the liquid in the channel, vortex formation is facilitated to be reduced. Although the trough 6 is not included in this example embodiment, it is contemplated by the present disclosure that the trough 6 may alternatively be included to enhance reducing vortex formation.

Exemplary embodiments of fluid flywheel devices that use water to facilitate increasing mechanical advantage are described herein. The invention is not limited to the embodiments of the devices described above in detail. Rather, other variations of the devices may be utilized within the spirit and scope of the claims.

The above description provides examples, and is not limiting of the scope, applicability, or configuration set forth in the claims. Changes may be made in the function and arrangement of elements discussed without departing from the spirit and scope of the disclosure. Various embodiments may omit, substitute, or add various components as appropriate. For instance, features described with respect to certain embodiments may be combined in other embodiments.

What is claimed is:

1. A fluid flywheel device comprising a container having an inner wall, an inlet for allowing a non-compressible liquid to enter the container, an outlet to allow the liquid to exit the container, a shaft concentrically positioned in the container, a paddle fixed to the shaft, and a bottom, the outlet being positioned above the level of the inlet causing liquid removed from the container to be from above the inlet.

2. The fluid flywheel device of claim 1 wherein:
   the inlet is tangentially aligned with the inner wall of the container; and,
   the outlet is tangentially aligned with the inner wall of the container on an opposite side of the container.

3. The fluid flywheel device of claim 1 wherein the fluid flywheel device further comprises means for reducing vortex formation in the liquid.

4. The fluid flywheel device of claim 3, wherein the shaft is a non-rotating shaft and the means for reducing vortex formation comprises:
   at least one arm extending radially from the shaft; and
   fixing the paddle to the at least one radial arm.

5. The fluid flywheel device of claim 3, wherein the means for reducing vortex formation comprises a channel extending about the perimeter of the bottom.

6. The fluid flywheel device of claim 1 wherein the inlet comprises multiple inlets and/or the outlet comprises multiple outlets.

7. The fluid flywheel device of claim 1 wherein the paddle comprises multiple paddles for extracting mechanical energy.

8. The fluid flywheel device of claim 1 having a means of injecting liquid into the liquid container by pump, gravity flow, or other mechanical or natural means.

9. The fluid flywheel device of claim 1 wherein useful work is done by capturing energy from the liquid within the container.

10. A fluid flywheel device comprising a container having an inner wall, an inlet for allowing liquid to enter, an outlet to allow liquid to exit, a non-rotating shaft, a rotatable post mounted on a top of the shaft, at least one arm extending radially from the post, and a paddle fixed to the at least one radial arm.

11. The fluid flywheel device of claim 10 wherein:
    the inlet is tangentially aligned with the inner wall of the container; and,
    the outlet is tangentially aligned with the inner wall of the container on an opposite side of the container.

12. The fluid flywheel device of claim 10 wherein the inlet comprises multiple inlets and/or the outlet comprises multiple outlets.

13. The fluid flywheel device of claim 10 wherein the paddle comprises multiple paddles for extracting mechanical energy.

14. The fluid flywheel device of claim 10 having a means of injecting liquid into the liquid container by pump, gravity flow, or other mechanical or natural means.

15. The fluid flywheel device of claim 10 wherein the bottom of the container has a channel running around the inner wall and/or the bottom of the container is curved in an upward direction.

16. The fluid flywheel device of claim 10 wherein useful work is done by capturing energy from the liquid within the container.

17. The fluid flywheel device of claim 10, wherein the outlet is above the inlet causing liquid removed from the container to be from above the inlet.

\* \* \* \* \*